United States Patent
Choi et al.

(10) Patent No.: US 11,390,800 B2
(45) Date of Patent: Jul. 19, 2022

(54) ZINC OXIDE-BASED QUANTUM DOT AGGREGATE CAPABLE OF EMITTING WHITE LIGHT

(71) Applicant: KOREA INSTITUTE OF SCIENCE AND TECHNOLOGY, Seoul (KR)

(72) Inventors: Won-Kook Choi, Seoul (KR); Hong Hee Kim, Seoul (KR); Yeonju Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 785 days.

(21) Appl. No.: 16/293,641

(22) Filed: Mar. 6, 2019

(65) Prior Publication Data
US 2019/0276736 A1    Sep. 12, 2019

(30) Foreign Application Priority Data
Mar. 12, 2018    (KR) .................. 10-2018-0028457

(51) Int. Cl.
| | | |
|---|---|---|
| C09K 11/08 | (2006.01) | |
| C09K 11/65 | (2006.01) | |
| C09K 11/54 | (2006.01) | |
| B82Y 30/00 | (2011.01) | |
| B82Y 20/00 | (2011.01) | |

(52) U.S. Cl.
CPC .............. *C09K 11/65* (2013.01); *C09K 11/54* (2013.01); *B82Y 20/00* (2013.01); *B82Y 30/00* (2013.01); *C09K 11/0811* (2013.01)

(58) Field of Classification Search
CPC ...... C09K 11/0811; C09K 11/65; C09K 11/54
See application file for complete search history.

(56) References Cited

U.S. PATENT DOCUMENTS

| | | | |
|---|---|---|---|
| 2014/0119049 A1 | 5/2014 | Kim et al. | |
| 2014/0264269 A1* | 9/2014 | Choi | H01L 51/502 438/47 |

FOREIGN PATENT DOCUMENTS

| | | |
|---|---|---|
| JP | 201118934 A | 1/2011 |
| KR | 1020110072210 A | 6/2011 |
| KR | 1020120092888 A | 8/2012 |

(Continued)

OTHER PUBLICATIONS

Son. Emissive ZnO-graphene quantum dots for white-light-emitting diodes. Nature Nanotechnology | vol. 7 | Jul. 2012 (Year: 2012).*

(Continued)

*Primary Examiner* — Matthew E. Hoban
(74) *Attorney, Agent, or Firm* — Cantor Colburn LLP

(57) ABSTRACT

Disclosed is a zinc oxide-based quantum dot aggregate capable of emitting white light is a mixture of a zinc oxide quantum dot and a zinc oxide-graphene quantum dot, in which the zinc oxide quantum dot emits yellow light when being irradiated with an excitation wavelength shorter than a wavelength corresponding to an energy band gap of the zinc oxide quantum dot, the zinc oxide-graphene quantum dot is in a form in which a zinc oxide quantum dot is bound with graphene via a Zn—O—C bond and emits blue-based light, and white light emission is possible through color rendering of yellow light emission by the zinc oxide quantum dot and blue-based light emission by the zinc oxide-graphene quantum dot.

5 Claims, 20 Drawing Sheets
(3 of 20 Drawing Sheet(s) Filed in Color)

(56) References Cited

FOREIGN PATENT DOCUMENTS

| KR | 1020140056490 | A | 5/2014 |
|---|---|---|---|
| KR | 101563478 | B1 | 10/2015 |
| WO | 2006022793 | A2 | 3/2006 |
| WO | 2012111893 | A1 | 8/2012 |

OTHER PUBLICATIONS

Roy. Surface Complexed ZnO Quantum Dot for White Light Emission with Controllable Chromaticity and Color Temperature. Langmuir 2017, 33, 14627-14633 (Year: 2017).*

Dong Ick Son et al., "Emissive ZnO-graphene quantum dots for white-light-emitting diodes", Nature Nanotechnology, May 2012, pp. 465-471, vol. 7, Macmillan Publishers Limited.

M. M. Hossain et al., "Synthesis of an efficient white-light photocatalyst composite of graphene and ZnO nanoparticles: Application to methylene blue dye decomposition", Applied Surface Science, 2015, pp. 55-65, vol. 354, Elsevier B.V.

Sungjee Kim et al., "Type-II Quantum Dots: CdTe/CdSe(Core/Shell) and CdSe/ZnTe(Core/Shell) Heterostructures", J. Am. Chem. Soc. Communications, 2003, pp. 11466-11467, vol. 125, American Chemical Society.

Yanqin Li et al., "Bright White-Light-Emitting Device from Ternary Nanocrystal Composites", Advanced Materials, 2006, pp. 2545-2548, vol. 18.

Yukio Narukawa et al., "Phosphor-Conversion White Light Emitting Diode Using InGaN Near-Ultraviolet Chip", Japanese Journal of Applied Physics, 2002, pp. L371-L373, vol. 41, The Japan Society of Applied Physics.

Yukio Narukawa et al., "White light emitting diodes with super-high luminous efficacy", Journal of Physics D: Applied Physics, 2010, 6 pages (354002), vol. 43, IOP Publishing Ltd.

Korean Notice of Allowance for corresponding Korean Patent Application No. 10-2018-0028457 dated Oct. 30, 2019.

Protima Rauwel et al., "A Review of the Synthesis and Photoluminescence Properties of Hybrid ZnO and Carbon Nanomaterials," Journal of Nanomaterials, 2016, pp. 1-12, vol. 2016, Article ID 5320625, Hindawi Publishing Corporation.

* cited by examiner

ZINC OXIDE-BASED QUANTUM DOT AGGREGATE CAPABLE OF EMITTING WHITE LIGHT

CROSS-REFERENCE TO RELATED APPLICATION

This application claims the priorities of Korean Patent Application No. 10-2018-0028457, filed on Mar. 12, 2018, and all the benefits accruing therefrom under 35 U.S.C. § 119, the contents of which in their entirety are herein incorporated by reference.

BACKGROUND

1. Field

The present specification discloses a zinc oxide-based quantum dot aggregate capable of emitting white light and a method for producing the same, and more particularly, the present specification discloses a zinc oxide-based quantum dot aggregate capable of emitting white light through the color rendering action of a zinc oxide quantum dot capable of emitting yellow light and a zinc oxide-graphene quantum dot capable of emitting blue-based light.

2. Description of the Related Art

White phosphor-converted LEDs (pcLEDs) based on phosphor-converted materials are the mainstream of white light sources. As the phosphor, inorganic host materials doped with rare earth elements of an optical activator are used. The chemical formula of inorganic host materials doped with rare earth elements is $A_3B_5O_{12}$ (A and B are metals). A typical host material is YAG (yttrium aluminum garnet, $Y_3Al_5O_{12}$), and cerium (Ce), neodymium (Nd), erbium (Er), and thorium (Th) are used as activator elements for the use of host material in the white light emission, laser, optical amplifier, and visible light blocking agent. For the wavelength conversion of YAG, the emission wavelength can be controlled to be long or short when Y is partly substituted with Gd and Al is partly substituted with Ga. YAG (yttrium aluminum garnet ($Y_3Al_5O_{12}$:$Ce^{3+}$)) is mainly used, but in some cases, it is used by being partially mixed with a red phosphor because of the high color temperature and low color rendering property, and a TAG phosphor ($Tb_3Al_5O_{12}$) in which Y is substituted with terbium (Tb) and silicate (($Sr,Ba)_2SiO_4$:Eu)-based, sulfide, oxynitride, nitride, and aluminate phosphors are also used. Recently, 1) a method applying YAG (yttrium aluminum garnet ($Y_3Al_5O_{12}$:$Ce^{3+}$)) used as a Ce(III) activator to an InGaN blue LED (in the region having a wavelength of 450 nm), 2) a method using an ultraviolet LED of AlInGaN (<350 nm) together with three primary color phosphors of red (R), green (G), and blue (B), and 3) a method using each of R, G, B LEDs are widely known as a typical white light source. Among these, 2) a method using an ultraviolet LED of AlInGaN (<350 nm) together with three primary color phosphors of red (R), green (G), and blue (B) is known to have the greatest color rendering index (CRI) and luminous efficiency, but it has a disadvantage that the manufacturing of LED has low doping efficiency at the time of manufacture of Al InGaN and is facing a technical problem that there is no phosphor suitable for UV excitation.

Meanwhile, studies to apply quantum dots defined as semiconductor nanoparticles which have a size of 10 nm or less and composed of from 10 to 100 atoms as phosphors of light emitting diodes have been recently actively conducted. Quantum dots have features that the band gap ($E_g$) increases in inverse proportion to the size (d) of the quantum dots, the band gap is further widened by the quantum confinement effect when the Bohr radius is smaller than the size of the quantum dots, and quantum dots have well-defined electronic energy levels between atoms and molecules and bulk.

The quantum dots having such features exhibit luminescence properties having spreading property that the full-width at half maximum (FWHM) at the time of light emission through optical excitation is several tens meV or less to be significantly small and thus having excellent purity, and excellent photoelectric material properties having a color rendering index (CRI) of 90% or more, color gamut, and a luminous efficiency of 70% or more, and thus studies to apply quantum dots to light emitting diodes, light absorbing diodes, electron transporting layers, bioimaging, photoelectrochemical cell electrodes, solar cells, and the like are underway. Quantum dots are classified into binary and ternary compounds depending on the constituents and classified in detail into II-VI group: CdTe, CdSe, and CdS, II-V group: InP and InAs, I-III-VI group: $CuInS_2$ and $AgInS_2$, and IV-VI group: PbSe and PbS. Among these, CdSe, PbS and the like of S, Se chalcogenide compound quantum dots of group II and group IV Cd, Pb and the like are known to be the most efficient until now. For example, the infrared-visible light region at from 0.8 eV to 2.6 eV is implemented through size control of core-shell structure quantum dots such as PbS/CdSe to CdSe/ZnS.

However, CdSe materials are classified as harmful substances by the European Union (EU) and the like and thus are not suitable to be used in the manufacture of photoelectric devices. In addition, the use of toxic substances such as Pb is also strictly regulated. Recently, InP and $CuInS_2$ which are In-based compounds have been actively studied as a new quantum dot material to overcome this problem. However, In also has problems of significantly high cost and monopolization of market prices due to limited reserves and exclusive supply from China and the like, and the In-based compounds have a disadvantage that the quantum efficiency thereof is relatively low as compared with the Cd- and Pb-based compounds.

Studies on oxides which are eco-friendly materials are recently underway. In the case of oxides, the band gap is defined as the difference between the conduction band minimum (CBM) and the valence band maximum (VBM), and the band gaps of most oxides are larger than the visible light region and have a size of 3.0 eV or more of the ultraviolet region. Among these, oxide semiconductor quantum dots, which can be used as materials for visible light emission or solar cells, utilize the electronic transition between the natural intrinsic defects present inside the bandgap, namely, in the intra-band among the oxide quantum dots having a band gap value of about from 3.0 eV to 4.0 eV which is not too great.

SUMMARY

The present disclosure has been made to solve the above problems, and an object thereof is to provide a zinc oxide-based quantum dots aggregate capable of emitting white light through the color rendering action of a zinc oxide quantum dots capable of emitting yellow light and a zinc oxide-graphene quantum dots capable of emitting blue-based light.

The zinc oxide-based quantum dots aggregate capable of emitting white light according to the present disclosure in order to achieve the object is a mixture of a zinc oxide quantum dots and a zinc oxide-graphene quantum dots, in which the zinc oxide quantum dots emit yellow light when being irradiated with an excitation wavelength shorter than a wavelength corresponding to an energy band gap of the zinc oxide quantum dots, the zinc oxide-graphene quantum dots are in a form in which a zinc oxide quantum dots are bound with graphene via a Zn—O—C bond and emit blue-based light, and white light emission is possible through color rendering of yellow light emission by the zinc oxide quantum dots and blue-based light emission by the zinc oxide-graphene quantum dots.

The zinc oxide quantum dots and the zinc oxide-graphene quantum dots are mixed at a mass ratio of from 0.5 to 1.16:1. In addition, the zinc oxide quantum dots and the zinc oxide-graphene quantum dots may be mixed at a mass ratio of from 0.7 to 0.9:1.

The zinc oxide-graphene quantum dots have an interstitial Zn ($Zn_i$) energy level, an excited interstitial Zn ($Zn_i^*$) energy level, a Zn vacancy ($V_{Zn}$) energy level, and a Zn—O—C energy level, and blue-based light can be emitted as an excited electron is transited from any one or more of the interstitial Zn ($Zn_i$) energy level, the excited interstitial Zn ($Zn_i^*$) energy level, or the Zn—O—C energy level to the Zn vacancy ($V_{Zn}$) energy level.

Oxygen vacancies ($V_O^+$, $V_O^{++}$) in the zinc oxide quantum dots are eliminated by a Zn—O—C bond between the zinc oxide quantum dots and graphene.

The interstitial Zn ($Zn_i$) energy level and the Zn vacancy ($V_{Zn}$) energy level are located between a conduction band minimum (CBM) and a valence band maximum (VBM) of the zinc oxide quantum dots, and the excited interstitial Zn ($Zn_i^*$) energy level and the Zn—O—C energy level are at higher locations than CBM of the zinc oxide quantum dot.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
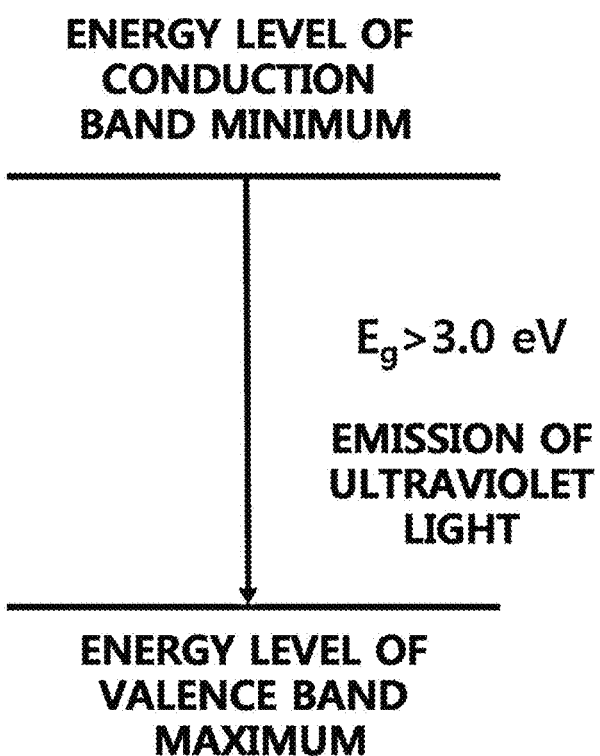
FIG. 1A is a reference view which illustrates a light-emitting mechanism of an oxide semiconductor without having a defect.

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

The present disclosure provides a technique on a zinc oxide-based quantum dot aggregate capable of emitting white light. The zinc oxide-based quantum dot aggregate capable of emitting white light according to the present disclosure is a quantum dot aggregate in which a zinc oxide quantum dot and a zinc oxide-graphene quantum dot are mixed.

In the present disclosure, yellow light emission is induced by zinc oxide quantum dots, blue-based (purple, indigo blue, blue) light emission is induced by zinc oxide-graphene quantum dots, and white light emission is possible through the color rendering action of the yellow and blue-based light. The principle of yellow light emission by zinc oxide quantum dots and the principle of blue light emission by zinc oxide-graphene quantum dots are as follows.

Zinc oxide quantum dots have features of emitting yellow light or blue light depending on the wavelength produced by the excitation light source. Yellow light is mainly emitted when the excitation wavelength is shorter than 370 nm based on about 370 nm corresponding to the energy band gap (about 3.44 eV) of the zinc oxide quantum dots, and blue light is emitted when the excitation wavelength is longer than 370 nm. Hence, the color of light emitted by zinc oxide quantum dots can be selected by controlling the excitation light source used to irradiate the zinc oxide quantum dots, for example, by controlling the wavelength of ultraviolet light. In order to attain white light emission according to the present disclosure, the yellow light emission by the zinc oxide quantum dots can be induced by applying a wavelength shorter than the wavelength corresponding to the energy band gap (about 3.44 eV) of the zinc oxide quantum dots as the wavelength produced by the excitation light source.

Hereinabove, it has been described that yellow light emission by zinc oxide quantum dots is possible. Next, the blue-based light emission by zinc oxide-graphene quantum dots will be described.

Zinc oxide quantum dots have defects of oxygen vacancies, interstitial Zn, and Zn vacancy in the ZnO lattice structure. The light emission in various colors by zinc oxide quantum dots is due to the defects such as oxygen vacancy ($V_o^{++}$), interstitial Zn ($Zn_i$), and Zn vacancy ($V_{Zn}$). In other words, it is possible to emit light having various wavelengths, namely, in various colors when zinc oxide quantum dots have defects such as oxygen vacancy ($V_o^{++}$), interstitial Zn ($Zn_i$), and Zn vacancy ($V_{Zn}$).

Figure 7:
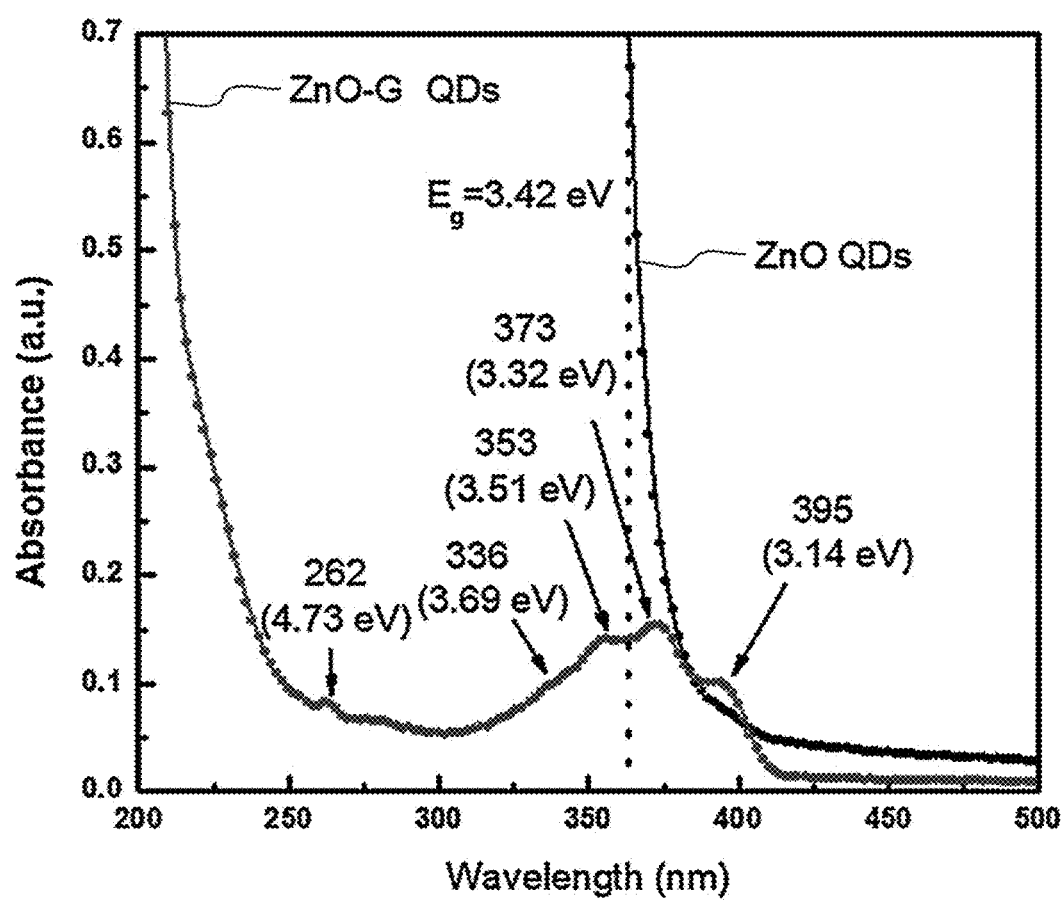
FIG. 7 illustrates the measurement results of ultraviolet-visible light absorption spectra for a zinc oxide quantum dots prepared in Experimental Example 1 and a zinc oxide-graphene composite quantum dots prepared in Experimental Example 2.

In the energy band diagram of zinc oxide quantum dots having defects, the energy levels of the respective defects of oxygen vacancy ($V_o^+$), interstitial Zn ($Zn_i$), excited interstitial Zn ($Zn_i^*$), and Zn vacancy ($V_{Zn}$) are distributed around the conduction band (CB) and valence band (VB) of zinc oxide quantum dots as illustrated in FIG. 7. In the following description, CBM (conduction band minimum) means the minimum value of conduction band and VBM (valence band maximum) means the maximum value of valence band. The energy level of CBM of zinc oxide (ZnO) is about 3.44 eV and the energy level of VBM thereof is 0 eV.

The energy levels of oxygen vacancy ($V_o^+$), interstitial Zn ($Zn_i$), and Zn vacancy ($V_{Zn}$) exist between the energy levels of CBM and VBM. The energy level (about 3.13 eV, 3.33 eV) of interstitial Zn ($Zn_i$) is close to that (about 3.44 eV) of CBM, the energy level (about 0.1 to 0.98 eV) of Zn vacancy ($V_{Zn}$) is at a location close to that (0 eV) of VBM, and the energy level (about 2.28 to 2.40 eV) of oxygen vacancy ($V_o^+$) and the energy level (about 1.84 to 2.08 eV) of oxygen vacancy ($V_o^{++}$) are located between the energy level of interstitial Zn ($Zn_i$) and the energy level of Zn vacancy ($V_{Zn}$). Meanwhile, the energy level (about 3.52 eV) of excited interstitial Zn ($Zn_i^*$) is at a slightly higher location than that (about 3.44 eV) of CBM.

The fact that the energy levels of various defects are located around the energy levels of CBM and VBM of zinc oxide quantum dots means that zinc oxide quantum dots have various energy band gaps. Moreover, the fact that zinc oxide quantum dots have various energy band gaps means that the emission wavelength of zinc oxide quantum dots is various. Ultimately, light in various colors can be emitted at various emission wavelengths.

Figure 1B:
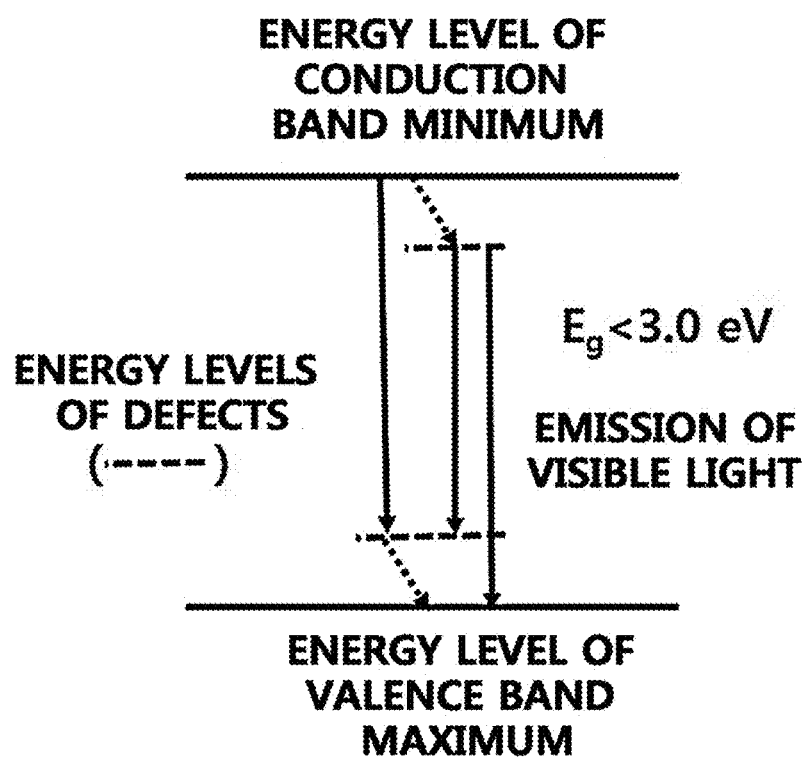
FIG. 1B is a reference view which illustrates a light-emitting mechanism of an oxide semiconductor having a defect.

In the case of zinc oxide quantum dots without having defects, when electrons at the energy level of VBM are excited to the energy level of CBM, light having a specific wavelength, namely, light as intensive as the energy of zinc oxide energy band gap ($E_g$) is emitted in the process in which the electrons return to the energy level of VBM (see FIG. 1A). On the other hand, when energy levels of various defects exist around the energy levels of CBM and VBM of zinc oxide quantum dots, the excited electrons can return to the energy levels of various defects present between the energy levels of the conduction band (CB) and valence band (VB) and it is thus possible to emit light having wavelengths corresponding to the energy levels of the respective defects (see FIG. 1B).

Figure 8:
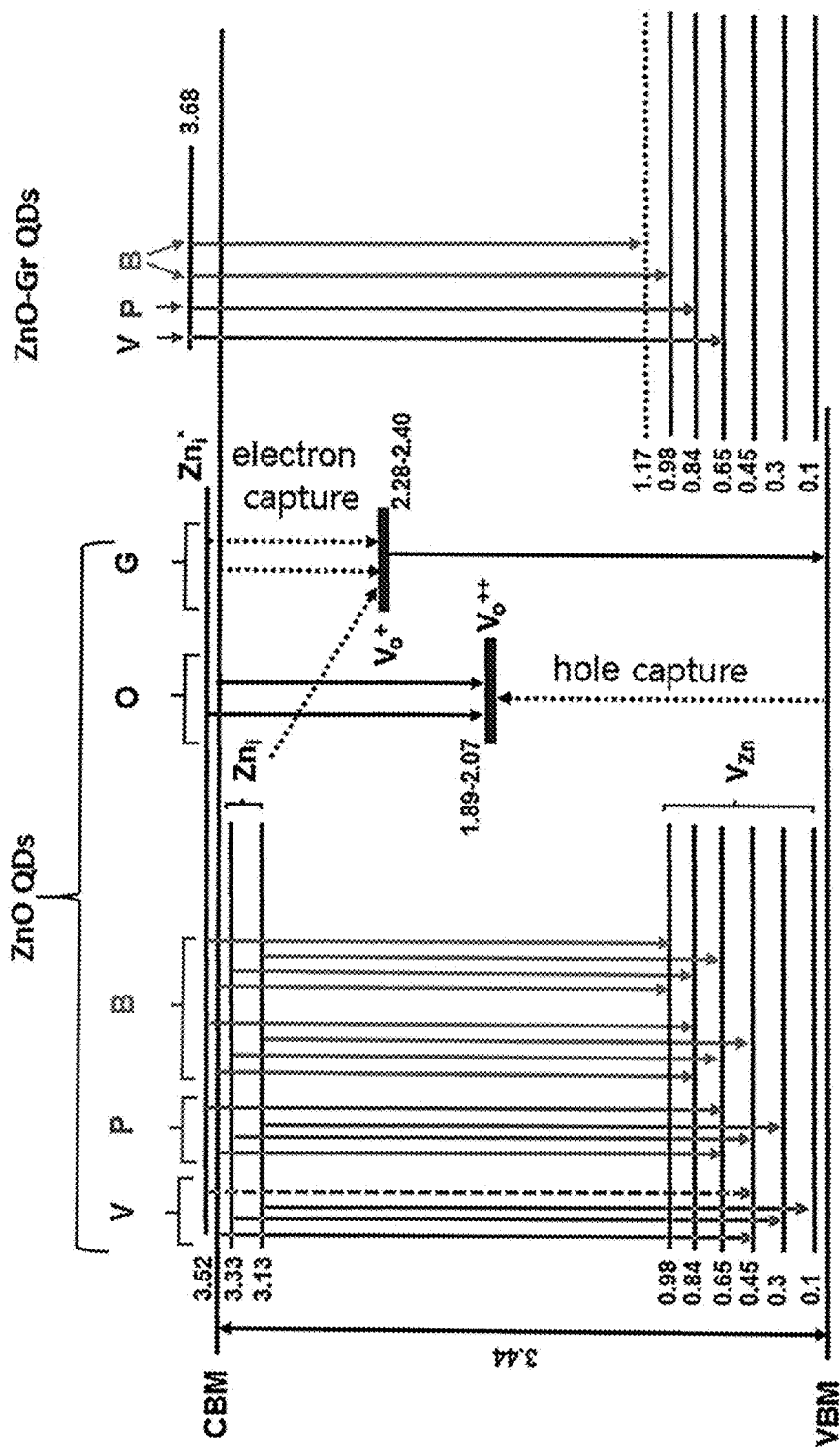
FIG. 8 illustrates energy band diagrams of a zinc oxide quantum dots prepared in Experimental Example 1 and a zinc oxide-graphene composite quantum dots prepared in Experimental Example 2.

Referring to FIG. 8, blue-based light such as blue, indigo blue, and purple light are emitted when the excited electrons move from the energy levels of CBM and interstitial Zn ($Zn_i$, $Zn_i^*$) to the energy level of Zn vacancy ($V_{Zn}$). Meanwhile, green and red light are emitted when the excited electrons move from the energy levels of CBM and excited interstitial Zn ($Zn_i^*$) to the energy level of VBM via the energy levels of the oxygen vacancies ($V_o^+$, $V_o^{++}$), and the green and red light are combined to finally emit yellow light.

The energy level of the defect to which the electrons excited in the zinc oxide quantum dots are transited and the color of light thus emitted are determined by the wavelength produced by the excitation light source used to irradiate the zinc oxide quantum dots. Yellow light is emitted when the wavelength produced by the excitation light source is shorter than about 370 nm corresponding to the energy band gap ($E_g$, to 3.44 eV) of zinc oxide quantum dots, and blue-based light is emitted when the wavelength produced by the excitation light source is longer than about 370 nm.

In this manner, the color of the light emitted is changed depending on the energy level of the defect to which the electrons excited in the zinc oxide quantum dots are transited. Blue-based (blue, indigo blue, violet) light is emitted when the excited electrons move to the energy level of Zn vacancy ($V_{Zn}$), and yellow light is emitted when the excited electrons move to the energy levels of oxygen vacancies ($V_o^+$, $V_o^{++}$).

The zinc oxide-graphene quantum dot according to the present disclosure utilizes the luminescence properties depending on the defect energy levels of zinc oxide quantum dots as described above. The zinc oxide-graphene quantum dot according to the present disclosure is formed by binding graphene to a zinc oxide quantum dot. The bonding of zinc oxide quantum dot with graphene leads to minimization of defect ratios or defect concentrations of oxygen vacancies ($V_o^+$, $V_o^{++}$) among various defects present in zinc oxide quantum dots.

As described above, oxygen vacancies ($V_o^+$, $V_o^{++}$) in zinc oxide quantum dots are associated with yellow light emission. Specifically, yellow light is emitted when the electrons excited in the zinc oxide quantum dots move to the energy levels of oxygen vacancies ($V_o^+$, $V_o^{++}$). Hence, a substance capable of emitting blue-based light can be obtained when the oxygen vacancies ($V_o^+$, $V_o^{++}$) associated with the yellow light emission among the various defects present in the zinc oxide quantum dots are eliminated.

To this end, the present disclosure provides a zinc oxide-graphene composite quantum dot in which graphene is bound to a zinc oxide quantum dot. Through the experiments to be described later, it has been confirmed that yellow light emission due to the energy levels of oxygen vacancies ($V_o^+$, $V_o^{++}$) is hardly observed when graphene is bound to zinc oxide quantum dots having various defects including oxygen vacancies ($V_o^+$, $V_o^{++}$), and this means that the oxygen vacancies ($V_o^+$, $V_o^{++}$) in the zinc oxide quantum dots are almost eliminated.

Graphene to be bound to zinc oxide quantum dots having various defects including oxygen vacancies ($V_o^+$, $V_o^{++}$) have functional groups containing oxygen. The functional groups containing oxygen is any one of ether (C—O), epoxy (C—O—C), carbonyl (C=O), carboxyl (O=C—OH), or hydroxyl (C—OH) or a combination thereof.

At the time of bonding of a zinc oxide quantum dot with graphene, a functional group containing oxygen of graphene binds with the oxygen vacancies ($V_o^+$, $V_o^{++}$) of the zinc oxide quantum dot to form a strong bond of Zn—O—C, and the oxygen vacancies ($V_o^+$, $V_o^{++}$) of the zinc oxide quantum dot thus disappear.

The disappearance of oxygen vacancies ($V_o^+$, $V_o^{++}$) by the bonding between a zinc oxide quantum dot and graphene is also confirmed through the energy band diagram. Referring to FIG. 5, it can be seen that the energy levels of oxygen vacancies ($V_o^+$, $V_o^{++}$) do not exist but a new energy level (about 3.68 eV) corresponding to the Zn—O—C bond is generated. As the energy levels of oxygen vacancies ($V_o^+$, $V_o^{++}$) do not exist, the excited electrons move from the energy level of Zn—O—C, the energy level of interstitial Zn ($Zn_i$), the energy level of excited interstitial Zn ($Zn_i^*$), and the energy level of CBM to the energy level (about 0.1 to 1.17 eV) of Zn vacancy ($V_{Zn}$), and blue-based light such as blue, indigo blue, and purple light are thus emitted.

In the case of zinc oxide quantum dots, there are defects of Zn vacancy ($V_{Zn}$) and oxygen vacancies ($V_o^+$, $V_o^{++}$), and the electrons excited are transited to the energy level of Zn vacancy ($V_{Zn}$) or the energy levels of oxygen vacancies ($V_o^+$, $V_o^{++}$) depending on the wavelength produced by the excitation light source. On the other hand, as oxygen vacancies ($V_o^+$, $V_o^{++}$) do not exist in zinc oxide-graphene quantum dots, the excited electrons are transited only to the energy level of Zn vacancy ($V_{Zn}$) regardless of the wavelength produced by the excitation light source. Hence, it is possible to emit blue-based light by the zinc oxide-graphene quantum dot regardless of the wavelength produced by the excitation light source.

Hereinabove, the principle of yellow light emission by a zinc oxide quantum dot and the principle of blue-based light emission by a zinc oxide-graphene quantum dot have been described. It is possible to emit yellow light by zinc oxide quantum dots and to emit blue light by zinc oxide-graphene quantum dots, and white light emission is thus possible through the color rendering action of the yellow light emission by zinc oxide quantum dots and the blue light emission by zinc oxide-graphene quantum dots. Consequently, it is possible to emit white light by the quantum dot aggregate according to the present disclosure, namely, the quantum dot aggregate in which a zinc oxide quantum dot and a zinc oxide-graphene quantum dot are mixed.

Hereinafter, the present disclosure will be described in more detail with reference to Experimental Examples.

EXPERIMENTAL EXAMPLE 1

Preparation of Zinc Oxide Quantum Dot

In order to prepare zinc oxide quantum dots having defects by a solution-precipitation method, Zn acetate (Zn($CH_3CO_2$)$_2$) and tetramethyl ammonium hydroxide pentahydrate (TMAH) are used. Solution A is prepared by mixing TMAH with ethanol, and Solution B is prepared by mixing Zn acetate with dimethyl sulfoxide (DMSO). Solution B is titrated into Solution A to form a ZnO quantum dot. The process of preparing such a zinc oxide quantum dot is described by the following Chemical Reaction Formulas 1 to 5, and zinc oxide is generated in the form of Formula 4 and/or Formula 5. In Formulas 1 to 5, 'solv' means a solution state.

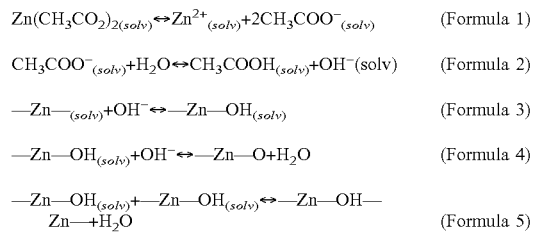

EXPERIMENTAL EXAMPLE 2

Preparation of Zinc Oxide-Graphene Composite Quantum Dot

In 120 ml of a nitric acid solution (17 M) and a sulfuric acid solution (19 M) (ratio 1:1 to 1:10), 5 g of graphite powder is placed and reacted for 2 hours while permitting an ultrasonic electric power of 200 W. Thereafter, the reaction mixture is washed with water and subjected to centrifugation continuously, and then dispersed in ethanol. Thereafter, the dispersion is dried at 70° C. for 24 hours, thereby obtaining graphene oxide (GO) changed to gray. The GO (40 mg) thus obtained is dispersed in a DMF solvent (100 ml) at a ratio of x:y=1:1 to 1:10, the temperature is raised to 100° C. to 150° C., thereby forming a whitish gray ZnO-G composite quantum dot. The ZnO-G composite quantum dots are dispersed in ethanol.

EXPERIMENTAL EXAMPLE 3

Crystal Structure and Luminescence Properties of Zinc Oxide Quantum Dot and Zinc Oxide-Graphene Quantum Dot The crystal structures and luminescence properties of the zinc oxide quantum dots prepared in Experimental Example 1 and the zinc oxide-graphene quantum dots prepared in Experimental Example 2 were analyzed.

Figure 2:
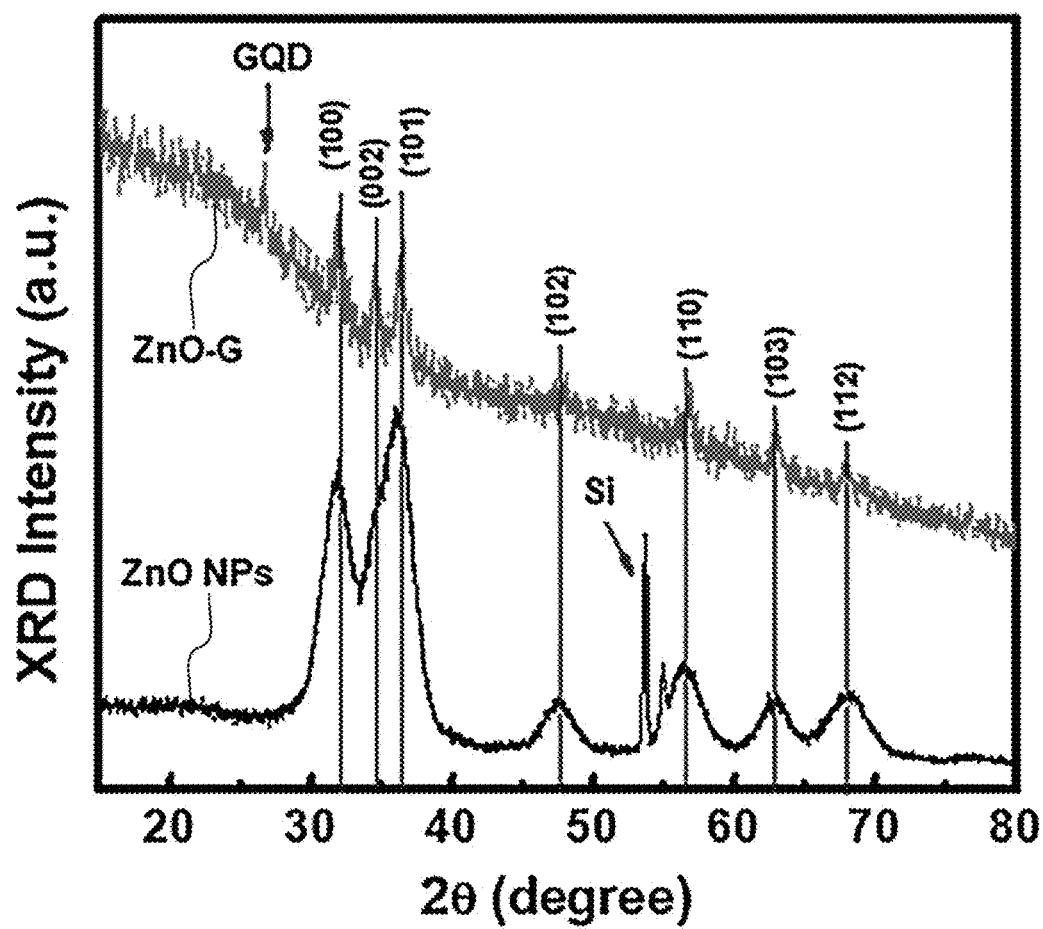
FIG. 2 illustrates the X-ray diffraction analysis results for a zinc oxide quantum dots prepared in Experimental Example 1 and a zinc oxide-graphene quantum dots prepared in Experimental Example 2.

As a result of X-ray diffraction analysis, it has been confirmed that diffraction peaks observed in polycrystalline ZnO such as ZnO(100), (002), and (101) have appeared in the zinc oxide quantum dots (ZnO QDs) prepared in Experimental Example 1 as illustrated in FIG. 2. Furthermore, as a result of observing the TEM photographs as illustrated in FIG. 3, it has been confirmed that the size of the zinc oxide quantum dots prepared in Experimental Example 1 is less than 4.4 nm, and the interval of diffraction pattern is d=0.247 nm, which coincides with the ZnO(101) plane interval.

Figure 3:
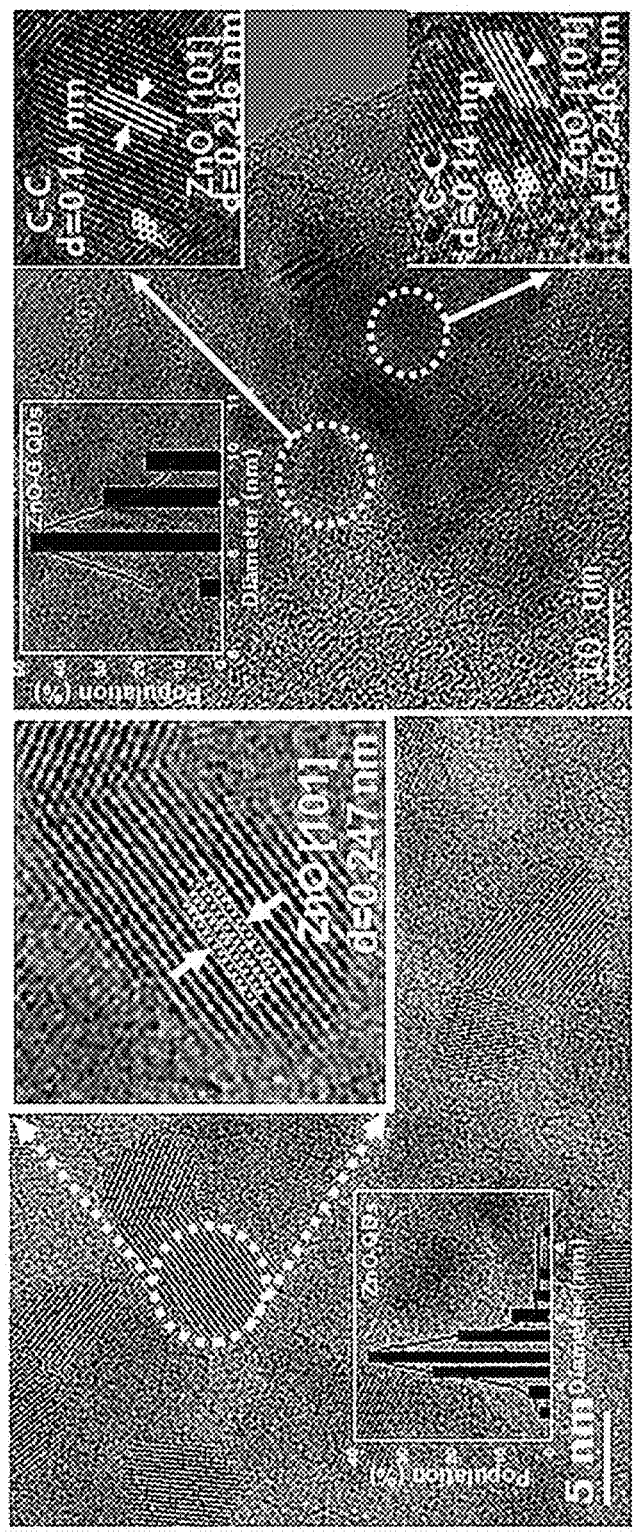
FIG. 3 illustrates transmission electron microscope (TEM) photographs and average size analysis results for a zinc oxide quantum dots and a zinc oxide-graphene composite quantum dots prepared in Experimental Example 1 and Experimental Example 2.

In addition, referring to FIG. 3, it has been confirmed that the zinc oxide-graphene quantum dots prepared in Experimental Example 2 have an average size of about 8.2 nm, and the interval of diffraction pattern is d=0.247 nm, which coincides with the ZnO(101) plane interval. Moreover, it has been confirmed that the regular hexagonal shape of the benzene ring is clearly distinguished from graphene bound to the ZnO surface, and the interatomic distance between carbon and carbon is d=0.146 nm, which coincides with the length of one side of hexagon of the graphene benzene ring.

Figure 4A:
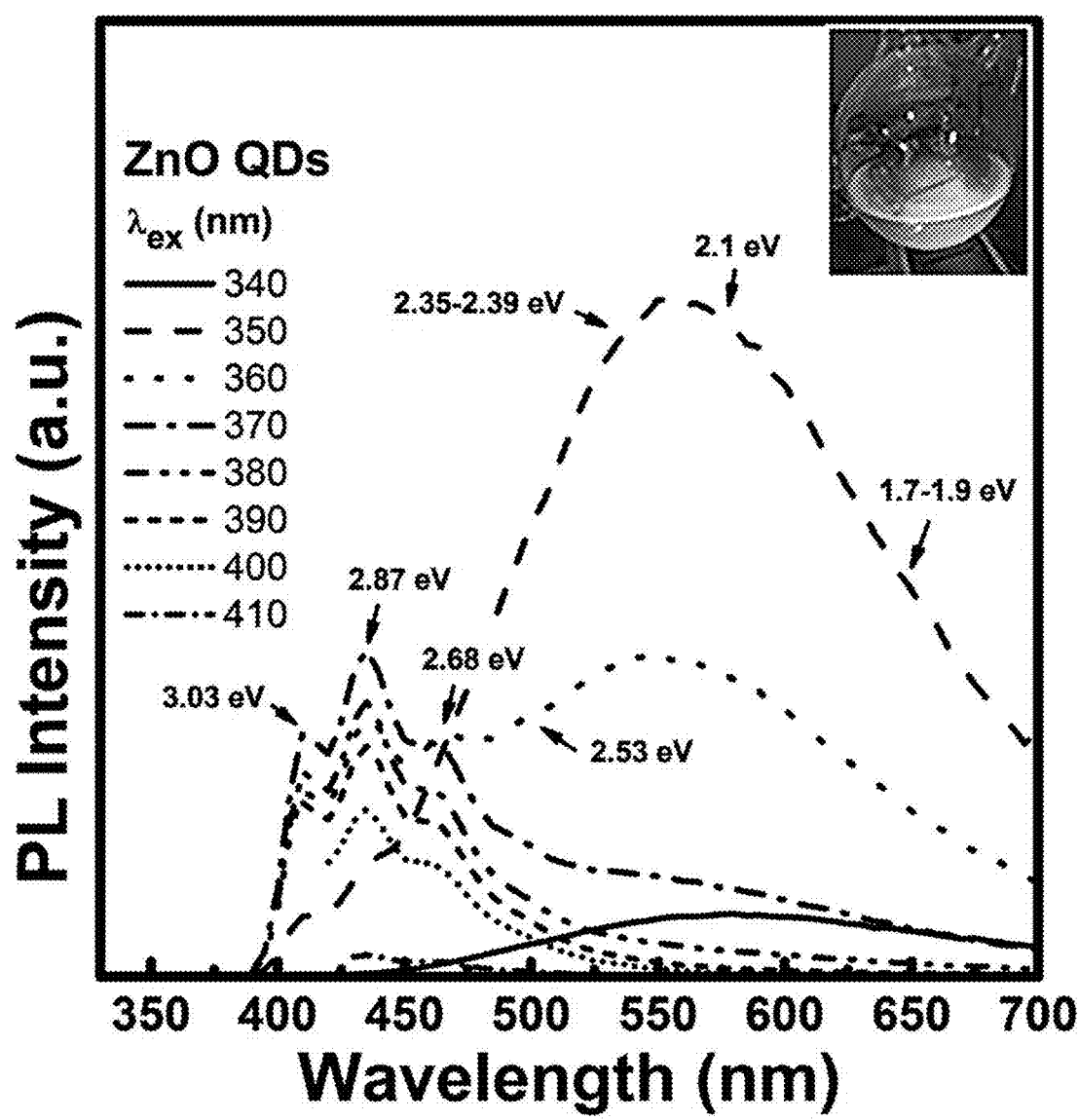
FIG. 4A illustrates emission spectra of a zinc oxide quantum dots prepared in Experimental Example 1 at various excitation wavelengths.
Figure 4B:
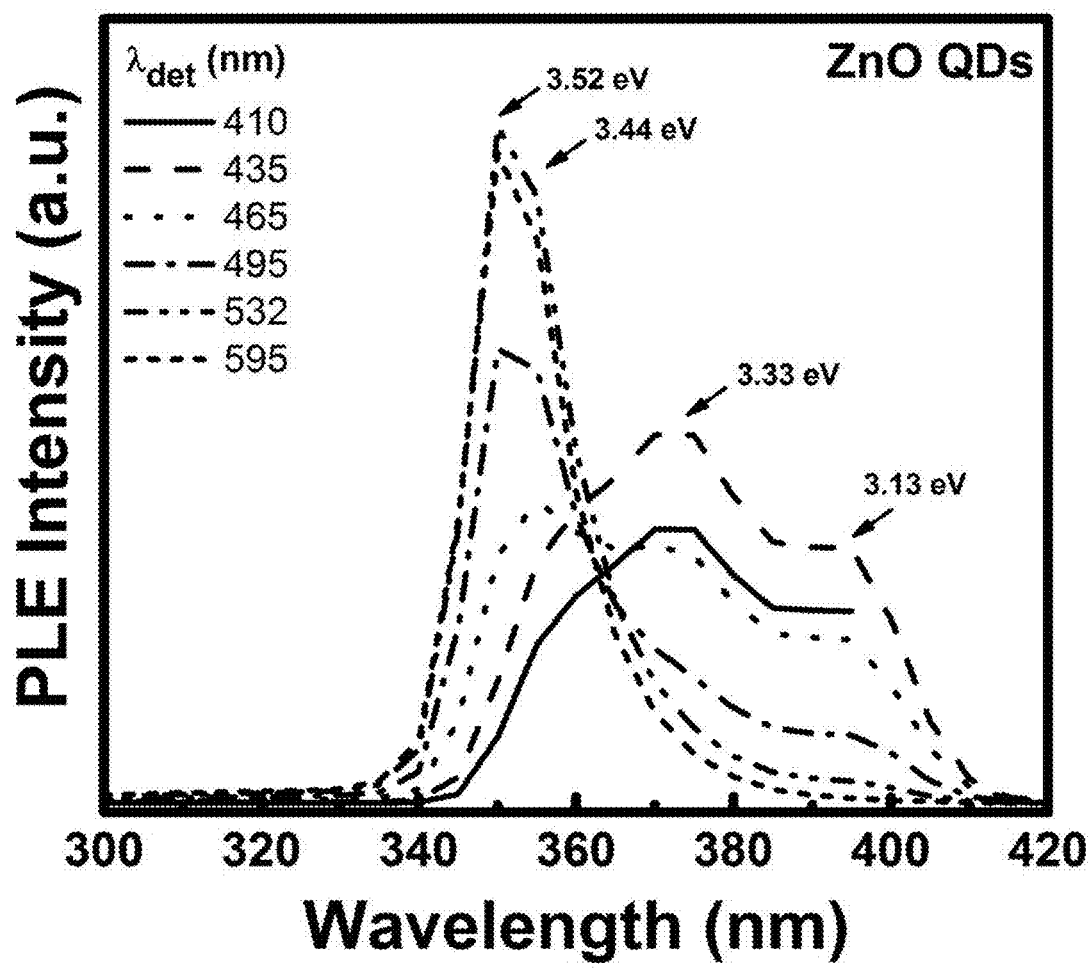
FIG. 4B illustrates excitation spectra of a zinc oxide quantum dots prepared in Experimental Example 1 depending on the emission spectra.

The zinc oxide quantum dots (ZnO QDs) prepared in Experimental Example 1 were irradiated with light having various excitation wavelengths (230 to 595 nm), and the luminescence properties thereof depending on the wavelengths were observed. FIG. 4A illustrates the emission spectra of the zinc oxide quantum dots prepared in Experimental Example 1 at various excitation wavelengths, and FIG. 4B illustrates the excitation spectra of the zinc oxide quantum dots prepared in Experimental Example 1 depending on the emission spectra.

Referring to FIG. 4A, when the excitation wavelength was shorter than 340 nm, a yellow light emission wavelength centered near an emission wavelength of 560 nm was observed, and the PL intensity was the greatest when the excitation wavelength was 350 nm. At this time, violet-blue light emission having an emission wavelength of 410 to 465 nm was also observed at the same time. The violet-blue light emission had the maximum value at an excitation wavelength of 370 nm, but the light emission having the violet-blue wavelength was diminished at an excitation wavelength longer than 370 nm and a yellow wavelength was hardly observed.

In order to investigate the energy levels contributing to yellow and violet-blue light emission, the photoluminescence excitation (PLE) was investigated. Referring to FIG. 4B, emission curves of the green light (563 nm: 2.20 eV) and red light (675 nm: 1.84 eV) forming yellow light were mainly related to the energy level of 3.52 eV, the emission wavelengths of 410 and 435 nm were mainly affected by the energy levels of 3.33 eV and 3.15 eV and the energy level of 3.52 eV in this order, and the emission wavelengths of 465 nm and 495 nm were affected in the change of purity of the intensity in the order of 3.53, 3.33 and 3.15 eV.

Figure 5A:
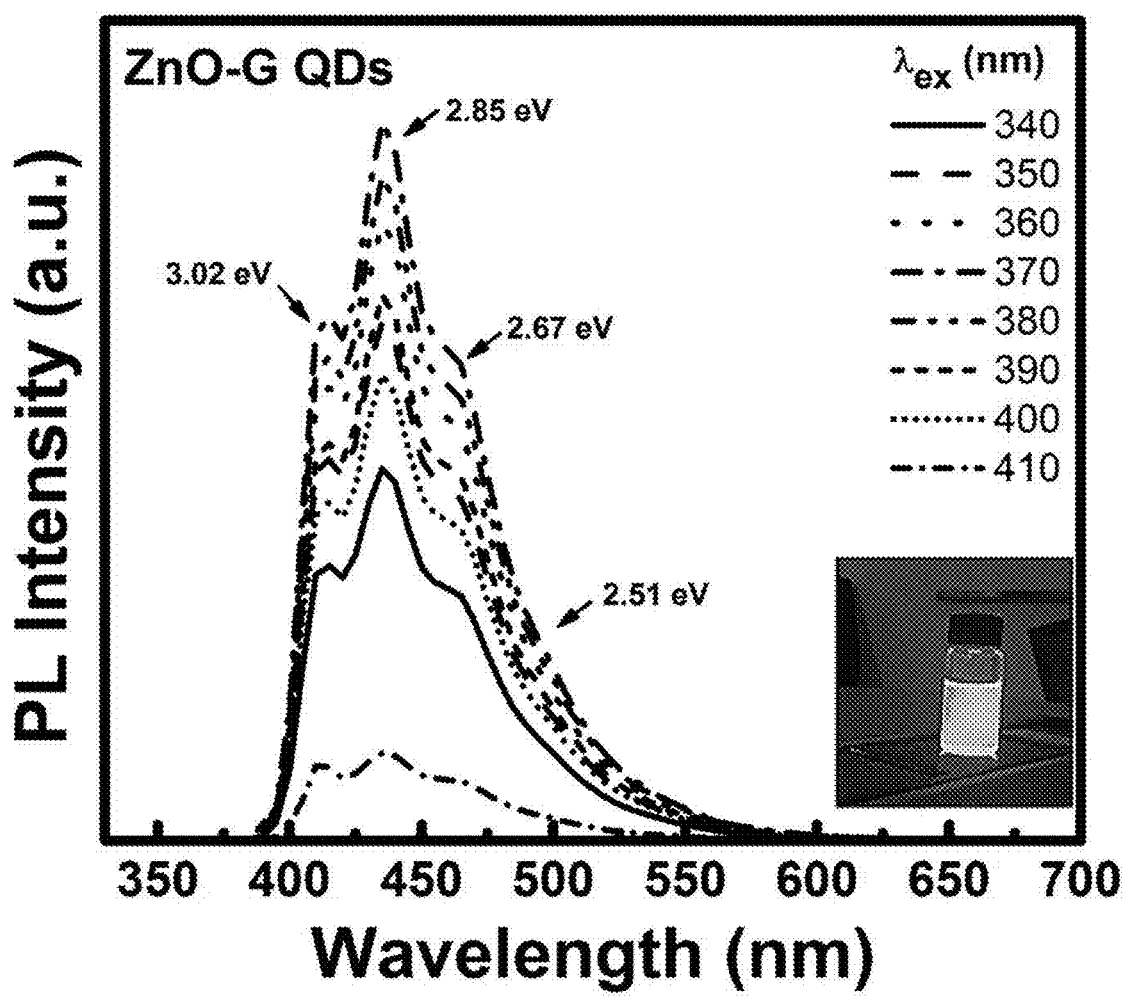
FIG. 5A illustrates emission spectra of a zinc oxide-graphene quantum dots prepared in Experimental Example 2 at various excitation wavelengths.

The luminescence properties of the zinc oxide-graphene composite quantum dots (ZnO-G) prepared in Experimental Example 2 were observed. FIG. 5A illustrates the emission spectra of the zinc oxide-graphene quantum dots prepared in Experimental Example 2 at various excitation wavelengths, and FIG. 5B illustrates the excitation spectra of the zinc oxide-graphene quantum dots prepared in Experimental Example 2 depending on the emission spectra.

Figure 5B:
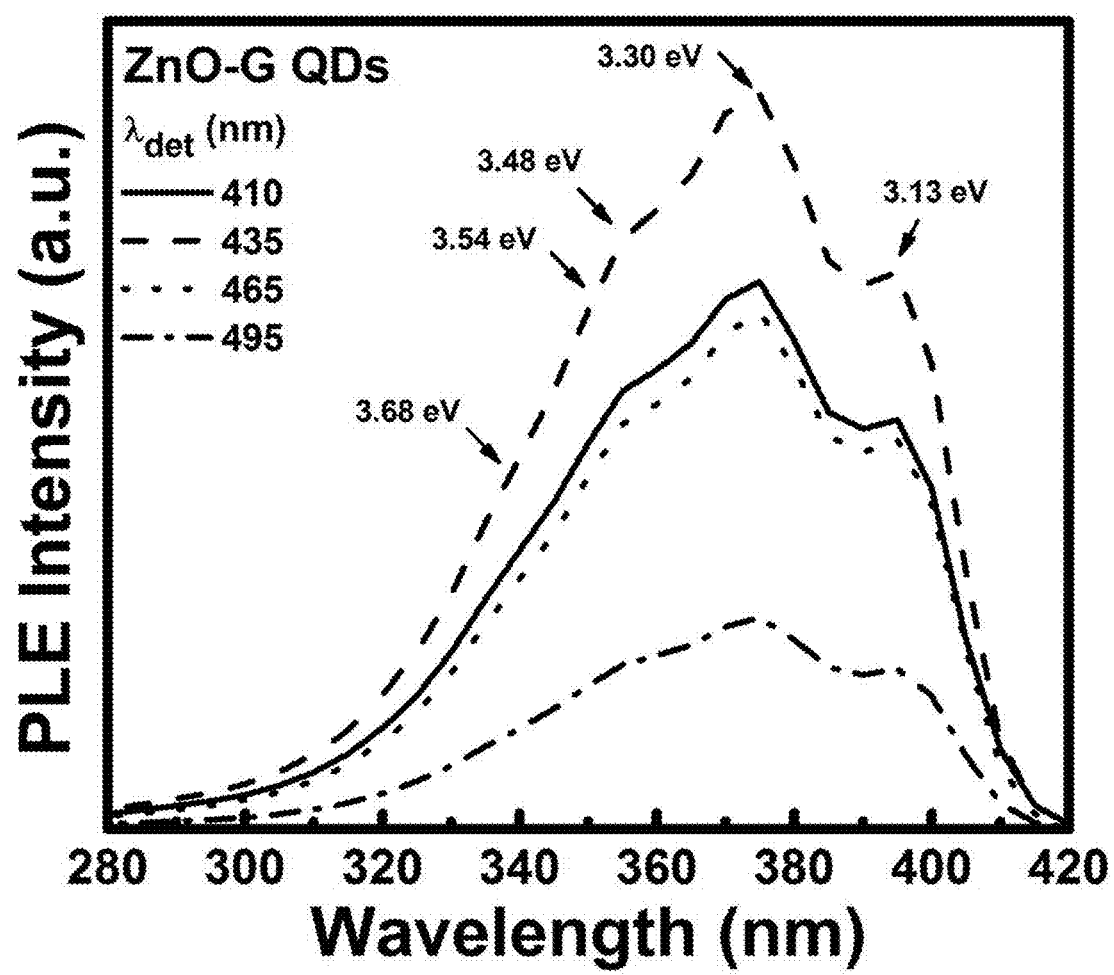
FIG. 5B illustrates excitation spectra of a zinc oxide-graphene quantum dots prepared in Experimental Example 2 depending on the emission spectra.

Referring to FIGS. 5A and 5B, in the case of the zinc oxide-graphene composite quantum dots (ZnO-G) prepared in Experimental Example 2, it can be seen that yellow light emission disappears regardless of the excitation wavelength (280 to 430 nm) but only blue-based light emission in the region of 410 to 495 nm, namely, purple, indigo blue, and blue light emission are observed.

Figure 6:
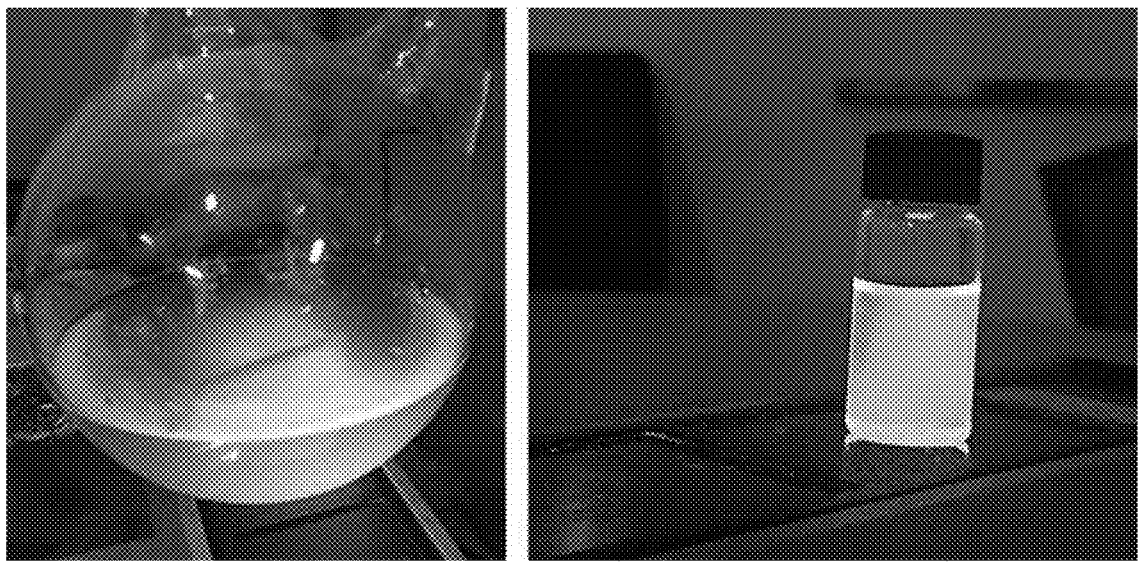
FIG. 6 illustrates emission images by a zinc oxide quantum dots and a zinc oxide-graphene composite quantum dots.

In order to confirm such emission spectra, FIG. 6 is images which illustrate that light is emitted when the zinc oxide quantum dot and zinc oxide-graphene composite quantum dot are irradiated with UV.

In addition, the ultraviolet-visible light absorption spectra of the zinc oxide quantum dots (ZnO QDs) prepared in Experimental Example 1 and the zinc oxide-graphene composite quantum dots (ZnO-G QDs) prepared in Experimental Example 2 were measured (see FIG. 7)

As illustrated in FIG. 7, it has been found that the energy band gap of ZnO QDs is 3.44 eV and absorption peaks at 3.14 eV, 3.33 eV, 3.51 eV, and 3.69 eV which are not observed in ZnO QDs are observed in ZnO-G QDs. The absorption peaks at 3.51 eV and 3.69 eV correspond to a value greater than the conduction band minimum (CBM) of ZnO QDs, namely, 3.44 eV.

Through the ultraviolet-visible light absorption spectra in FIG. 7, the energy levels and luminescence properties of the zinc oxide quantum dots (ZnO QDs) prepared in Experimental Example 1 and the zinc oxide-graphene composite quantum dots(ZnO-G QDs) prepared in Experimental Example 2 can be presumed as illustrated in FIG. 8.

Referring to FIG. 8, in the case of the zinc oxide quantum dots (ZnO QDs) prepared in Experimental Example 1, the energy level of oxygen vacancy ($V_o^{++}$), the energy level of interstitial Zn ($Zn_i$), and the energy level of Zn vacancy ($V_{Zn}$) are disposed in the energy band gap between CBM (conduction band minimum) and VBM (valence band maximum). In addition, the zinc oxide quantum dots (ZnO QDs) further have defect pairs of oxygen vacancy ($V_o^+$) and excited interstitial Zn ($Zn_i^*$), the excited interstitial Zn ($Zn_i^*$) which has lost one more electron than the interstitial Zn ($Zn_i$) has a higher energy level than that of CBM, and the energy level of oxygen vacancy ($V_o^+$) is located at the energy band gap ($E_g$) of zinc oxide quantum dots.

From such an energy band diagram of zinc oxide quantum dots (ZnO QDs), it can be seen that the energy levels of oxygen vacancies ($V_o^+$, $V_o^{++}$) are associated with the orange and green light emission and the energy level of Zn vacancy ($V_{Zn}$) is associated with the blue-based light emission.

Specifically, green (563 nm: 2.20 eV) light emission occurs in the process in which the excited electrons move from the energy levels of conduction band (CB) and excited interstitial Zn ($Zn_i^*$) to the energy level of valence band (VB) via the energy level of oxygen vacancy ($V_o^+$), and red (675 nm: 1.84 eV) light emission occurs in the process in which the excited electrons move from the energy levels of conduction band (CB) and excited interstitial Zn ($Zn_i^*$) to the energy level of oxygen vacancy ($V_o^{++}$). Yellow light emission occurs through color rendering of such green light emission and red light emission.

Green light emission and red light emission have features that the emission intensity is high when the excitation wavelength has energy level of 3.52 eV or more and has the maximum value at an excitation wavelength of 350 nm which is significantly close to the energy level of 3.52 eV. This is because $Zn_i^*$, $V_o^+$, and $V_o^{++}$ are formed since the hybridization formation energy of $Zn_i$-$V_O$ is significantly small, resonance is caused since 3.52 eV energy corresponds to the $Zn_i^*$ energy level, and thus green and red light emission associated with the oxygen vacancy have the greatest intensity. In the case of short wavelengths having greater energy than 350 nm, it is presumed that most of these short wavelengths do not contribute much to the green and red light emission because of the thermalization that the short wavelengths collide with the phonons in CBM and lose the energy.

Meanwhile, blue, indigo blue, and violet light emission occur in the process in which the excited electrons move from the energy levels of conduction band (CB) and interstitial Zn ($Zn_i$, $Zn_i^*$) to the energy level of Zn vacancy ($V_{Zn}$). In zinc oxide quantum dots, various energy levels of Zn vacancy ($V_{Zn}$) exist, light close to violet is emitted as the excited electrons are transited to a lower Zn vacancy ($V_{Zn}$) energy level, and light close to blue is emitted as the excited electrons are transited to a higher Zn vacancy ($V_{Zn}$) energy level.

When the excitation wavelength is increased from 350 nm to 360 nm corresponding to the band gap (3.44 eV) of zinc oxide quantum dots, the intensity of yellow light emission decreases but the intensity of violet-blue light emission increases, and the intensity of violet-blue light emission has the maximum value at an excitation wavelength of 370 nm. It can be seen that the intensity of violet-blue light emission is greatly affected by the energy levels of 3.33 eV and 3.15 eV particularly, as can be seen from the PLE (photoluminescence excitation) in FIG. 4B. The energy levels of 3.33 eV and 3.15 eV are energy levels located below that of CBM and both of these are the energy level of interstitial Zn ($Zn_i$). Light emission at 410, 435, 465, and 495 nm is well described by the electron transition to the four Zn vacancy ($V_{Zn}$) energy levels present above that of VBM.

Next, the energy levels and luminescence properties of the zinc oxide-graphene composite quantum dots (ZnO-G QDs) prepared in Experimental Example 2 will be described.

Referring to FIG. 5B and FIG. 7, in the case of zinc oxide-graphene composite quantum dots (ZnO-G QDs) prepared in Experimental Example 2, it can be seen that there is a more energy level corresponding to 3.68 eV in addition to the interstitial Zn ($Zn_i$, $Zn_i^*$) energy levels as the energy level involved in blue light emission. The energy level corresponding to 3.68 eV is presumed to be the energy level corresponding to the Zn—O—C bond formed by the bonding of a zinc oxide quantum dot with graphene.

The formation of Zn—O—C bond by bonding of a zinc oxide quantum dot with graphene means that oxygen vacancies ($V_o^+$, $V_o^{++}$) present in the zinc oxide quantum dots disappear by the formation of Zn—O—C bond. Hence, ZnO-G QDs have interstitial Zn ($Zn_i$, $Zn_i^*$) energy levels, a Zn vacancy ($V_{Zn}$) energy level, and a Zn—O—C energy level, but does not have oxygen vacancy ($V_o^+$, $V_o^{++}$) energy levels.

As described above, only blue-based light emission occurs as ZnO-G QDs do not have the oxygen vacancy ($V_o^+$, $V_o^{++}$) energy levels involved in the green and orange light emission, and the intensity of blue-based light emission is enhanced as a new energy level involved in the blue-based light emission is generated by the formation of Zn—O—C bond. Blue light emission by ZnO-G QDs has the maximum value at an excitation wavelength of 370 nm corresponding to 3.33 eV as in the case of ZnO quantum dots.

Figure 9A:
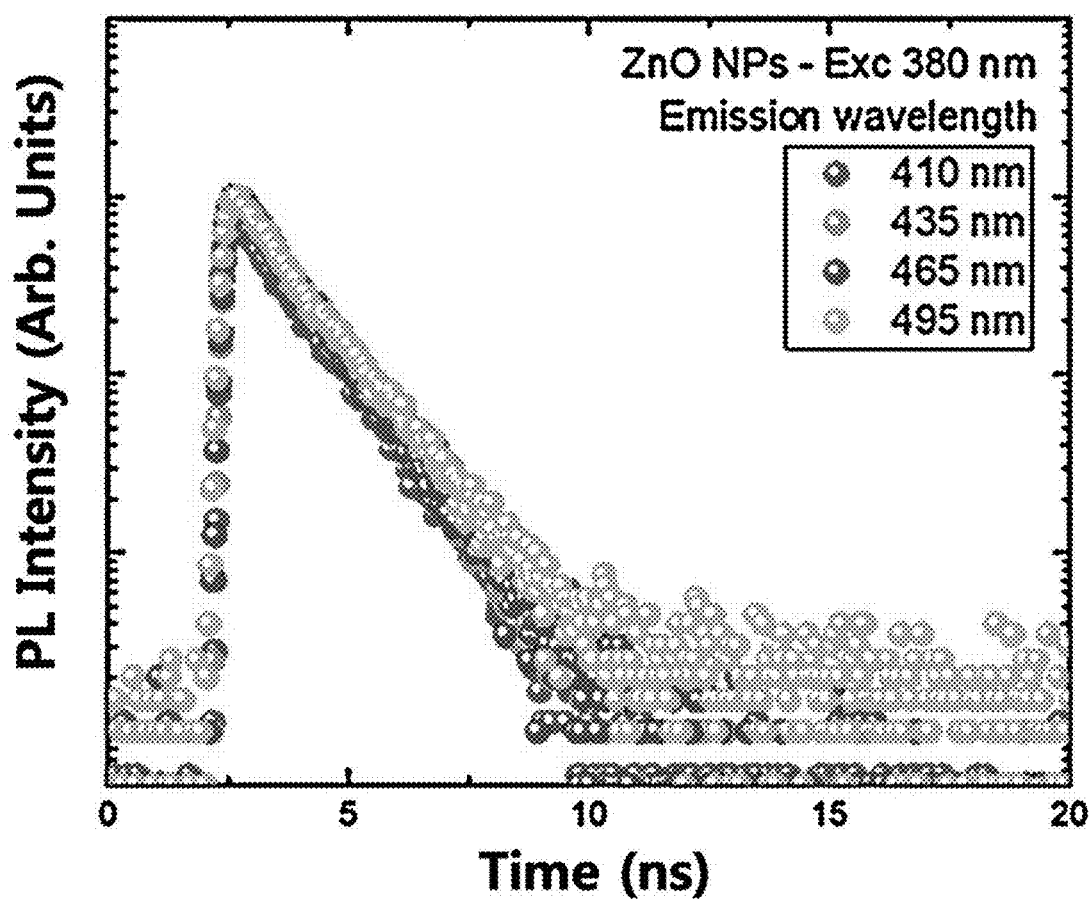
FIGS. 9A to 9D illustrate time-resolved emission spectral spectra of a zinc oxide quantum dots prepared in Experimental Example 1 and a zinc oxide-graphene composite quantum dots prepared in Experimental Example 2.
Figure 9B:
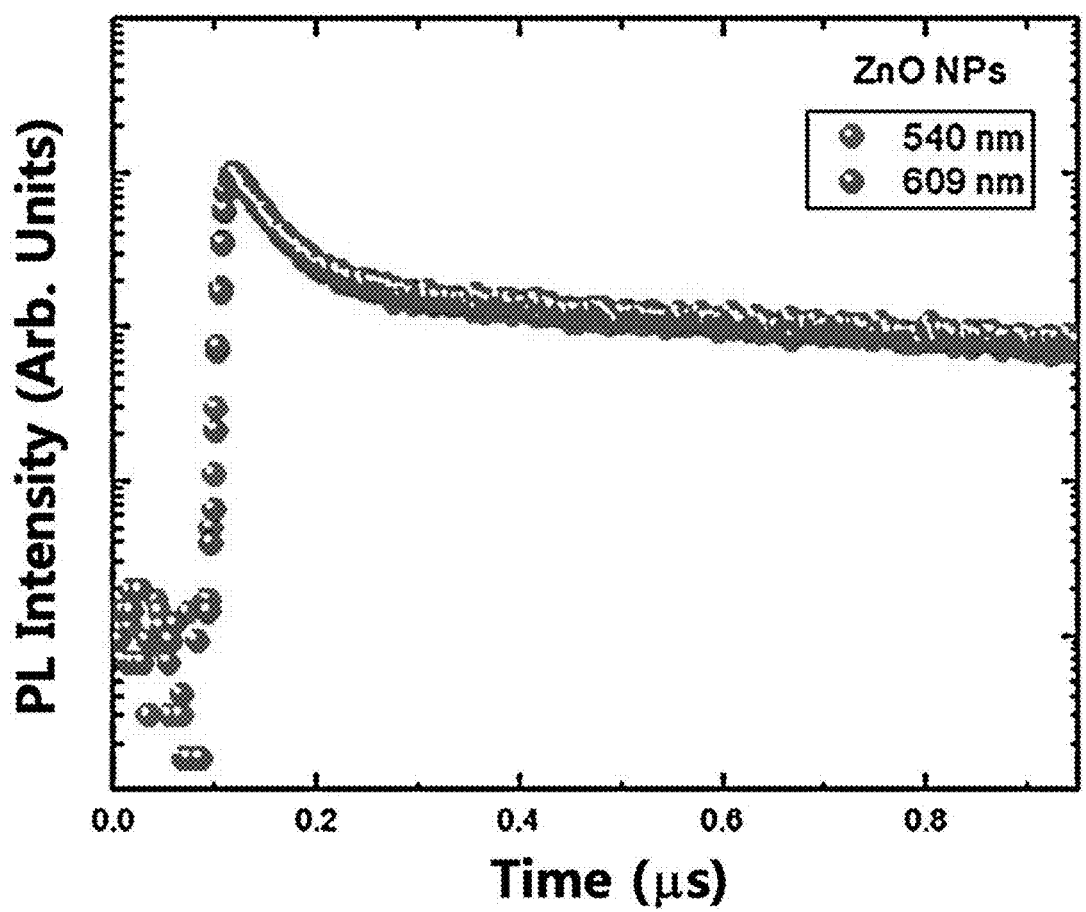
Figure 9C:
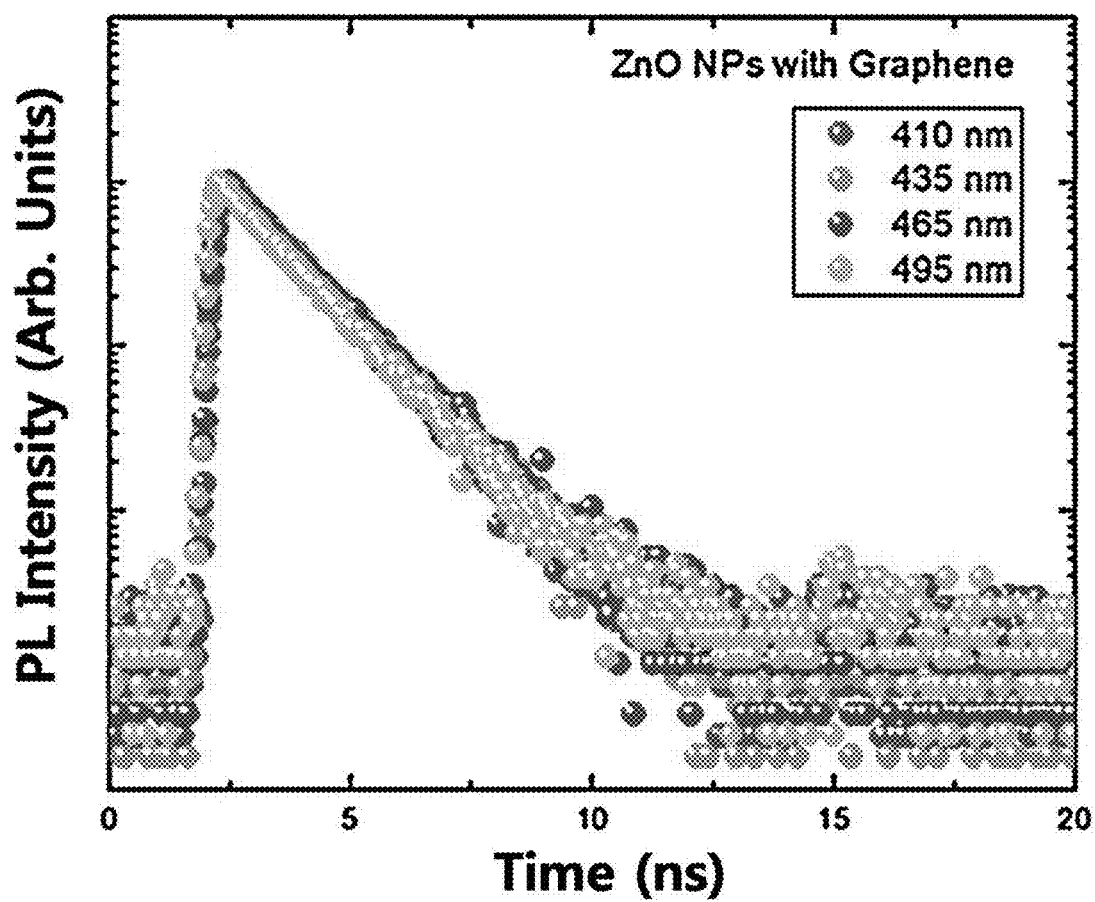
Figure 9D:
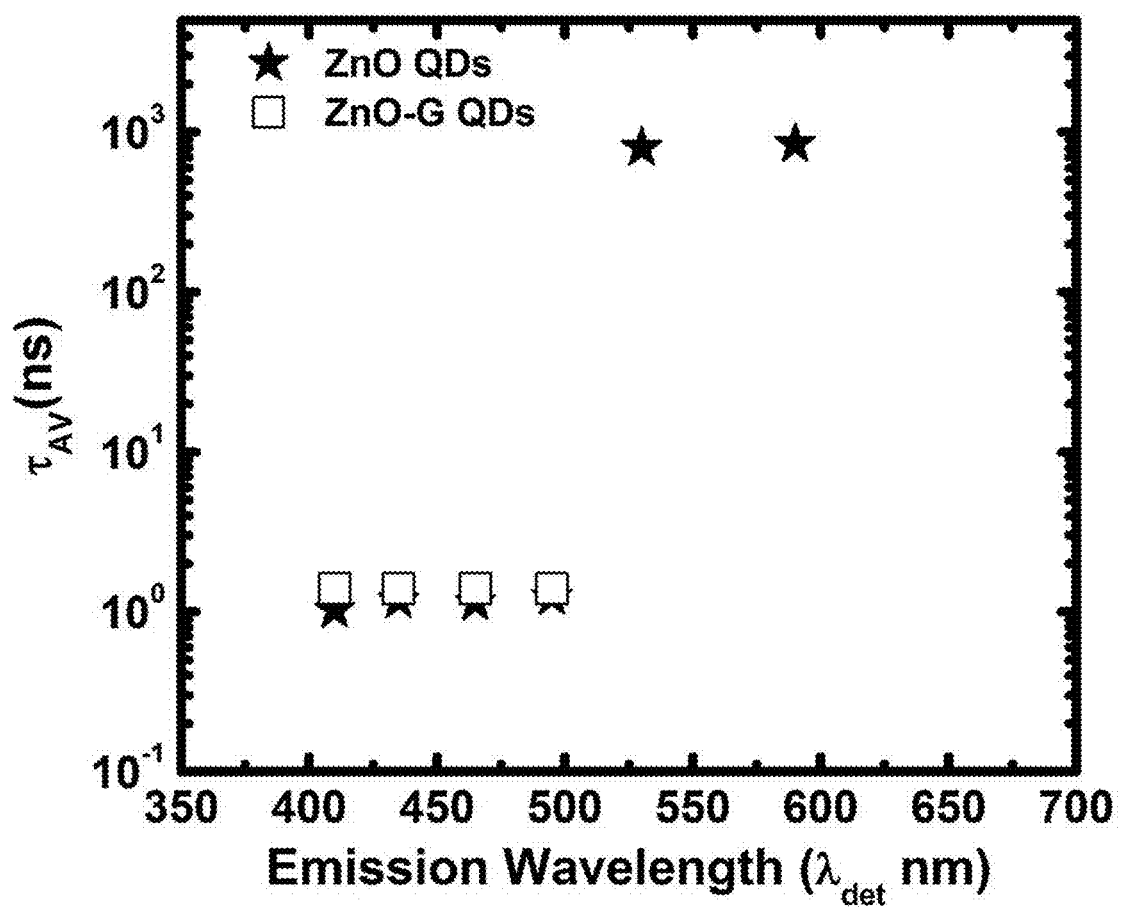

Next, the lifetime of yellow light emission by the zinc oxide quantum dots prepared in Experimental Example 1 and the lifetime of blue-based light emission by the zinc oxide-graphene quantum dots prepared in Experimental Example 2 were measured. FIG. 9A illustrates the time-resolved emission spectral spectrum (blue-based light emission) of the zinc oxide quantum dots prepared in Experimental Example 1, FIG. 9B illustrates the time-resolved emission spectral spectrum (yellow light emission) of the zinc oxide quantum dots prepared in Experimental Example 1, FIG. 9C illustrates the time-resolved emission spectral spectrum of the zinc oxide-graphene quantum dots prepared in Experimental Example 2, and FIG. 9D illustrates the measurement results of the average lifetime for the zinc oxide quantum dots and the zinc oxide-graphene quantum dots.

Referring to FIGS. 9A to 9D, it has been confirmed that the average lifetime of green and red light emission, namely, yellow light emission is about 0.8 μs (micro-sec), and the average lifetime of blue-based light emission is about from 1.2 to 1.4 ns (nano-sec).

EXPERIMENTAL EXAMPLE 4

Preparation and Luminescence Properties of Quantum Dot Aggregate

The zinc oxide quantum dots prepared in Experimental Example 1 and the zinc oxide-graphene quantum dots prepared in Experimental Example 2 were mixed at a predetermined ratio to prepare a quantum dot aggregate in which a zinc oxide quantum dot and a zinc oxide-graphene quantum dot were mixed. The luminescence properties of the quantum dot aggregate were analyzed.

Figure 10A:
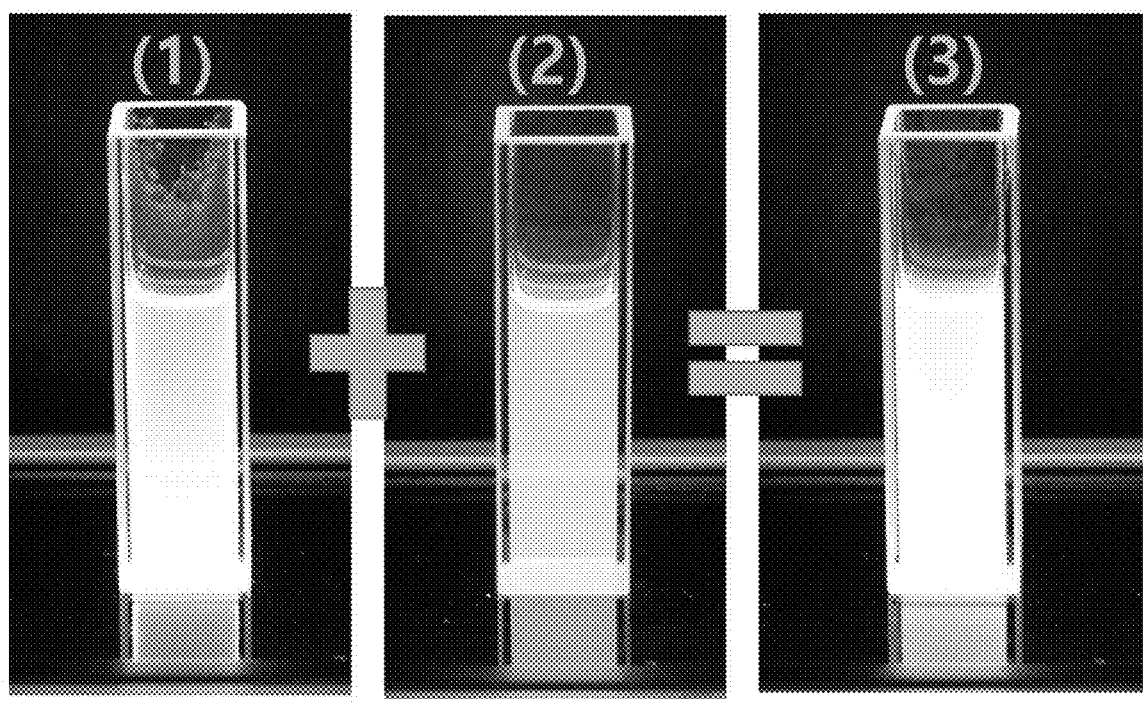
FIG. 10A is a photograph which illustrates that white light is emitted when a zinc oxide quantum dots prepared in Experimental Example 1 and a zinc oxide-graphene composite quantum dots prepared in Experimental Example 2 are each dispersed in ethanol and then irradiated with UV.
Figure 10B:
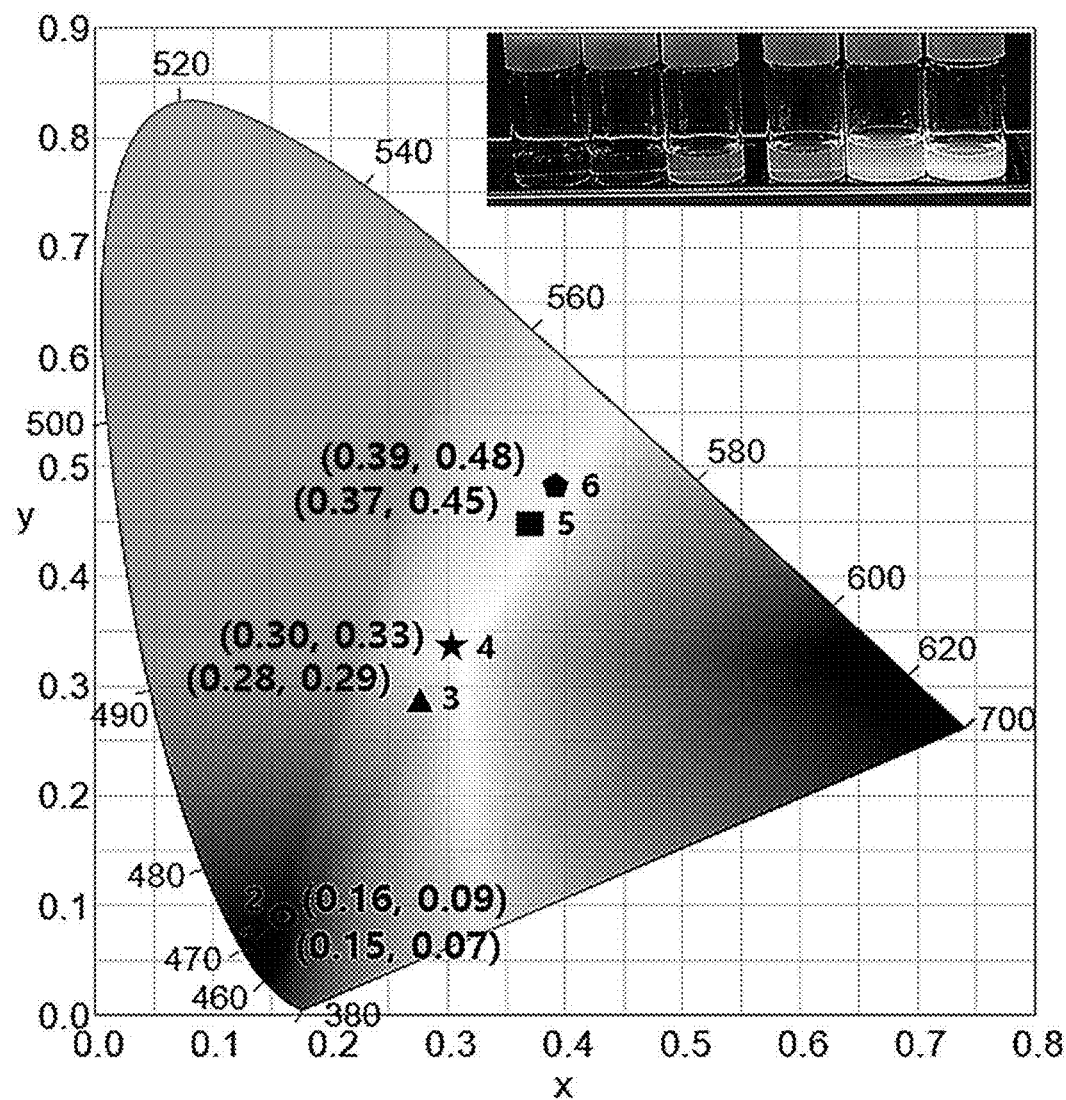
FIG. 10B is a photograph which illustrates light emission by Sample 1 to Sample 6 according to Experimental Example 4 and a color coordinate.

An ethanol solution (20 mg/ml) in which the zinc oxide quantum dots prepared in Experimental Example 1 were dispersed and an ethanol solution (10 mg/ml) in which the zinc oxide-graphene quantum dots prepared in Experimental Example 2 were dispersed were respectively prepared. The ethanol solutions in which the quantum dots were dispersed were mixed together in 1 ml of pure ethanol solution at the ratio presented in the following Table 1. Thereafter, the ethanol solution was evaporated to prepare a quantum dot aggregate in which a zinc oxide quantum dot and a zinc oxide-graphene quantum dot were mixed, and then the quantum dot aggregate was irradiated with ultraviolet light having an excitation wavelength of 350 nm to attain a color coordinate (see FIG. 10B).

As a result of the experiment, it has been confirmed that white light is emitted by the quantum dot aggregate of Sample 4 (see FIG. 10A), and light close to white is emitted in the case of Sample 3 and Sample 5. On the other hand, blue-based light is mainly emitted in the case of Sample 1 and Sample 2, and yellow light is mainly emitted in the case of Sample 6.

The ratio of the zinc oxide quantum dot to the zinc oxide-graphene quantum dot in the quantum dot aggregate of Sample 4 is calculated to be ZnO:ZnO-G≈0.83:1. In addition, the zinc oxide quantum dot and the zinc oxide-graphene quantum dot constitute the quantum dot aggregate of Sample 3 at a ratio of ZnO:ZnO-G≈0.5:1 and the quantum dot aggregate of Sample 5 at a ratio of ZnO:ZnO-G≈1.16:1.

Based on these experimental results, it can be seen that the quantum dot aggregate according to the present disclosure emits white light when zinc oxide quantum dots (ZnO) and zinc oxide-graphene (ZnO-G) quantum dots are mixed at a mass ratio of 0.83:1, and the quantum dot aggregate emits white-based light close to white when zinc oxide quantum dots (ZnO) and zinc oxide-graphene (ZnO-G) quantum dots are mixed at a mass ratio of from 0.5 to 1.16:1. Consequently, the quantum dot aggregate according to the present disclosure is prepared by mixing zinc oxide quantum dots (ZnO) and zinc oxide-graphene (ZnO-G) quantum dots at a mass ratio of preferably from 0.5 to 1.16:1 and more preferably from 0.7 to 0.9:1.

EXPERIMENTAL EXAMPLE 5

Implementation of UV-LED as Blue, Yellow, and White LEDs

Figure 11A:
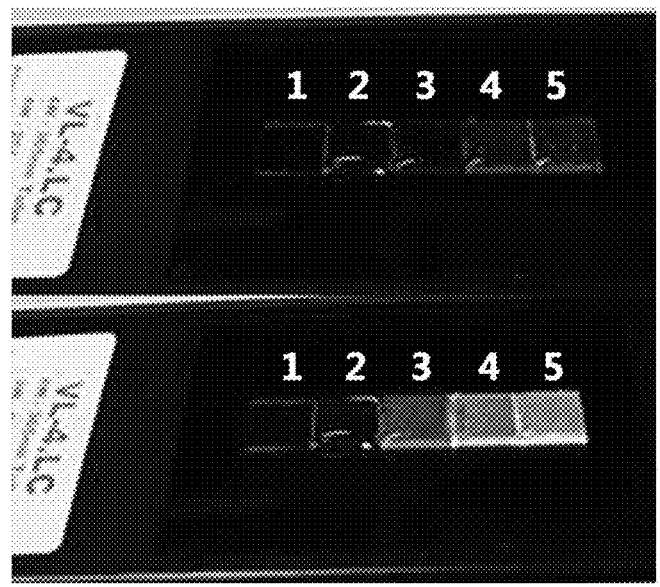
FIG. 11A is a photograph which illustrates that light is emitted when Sample 1 to Sample 5 according to Experimental Example 5 are irradiated with UV.
Figure 11B:
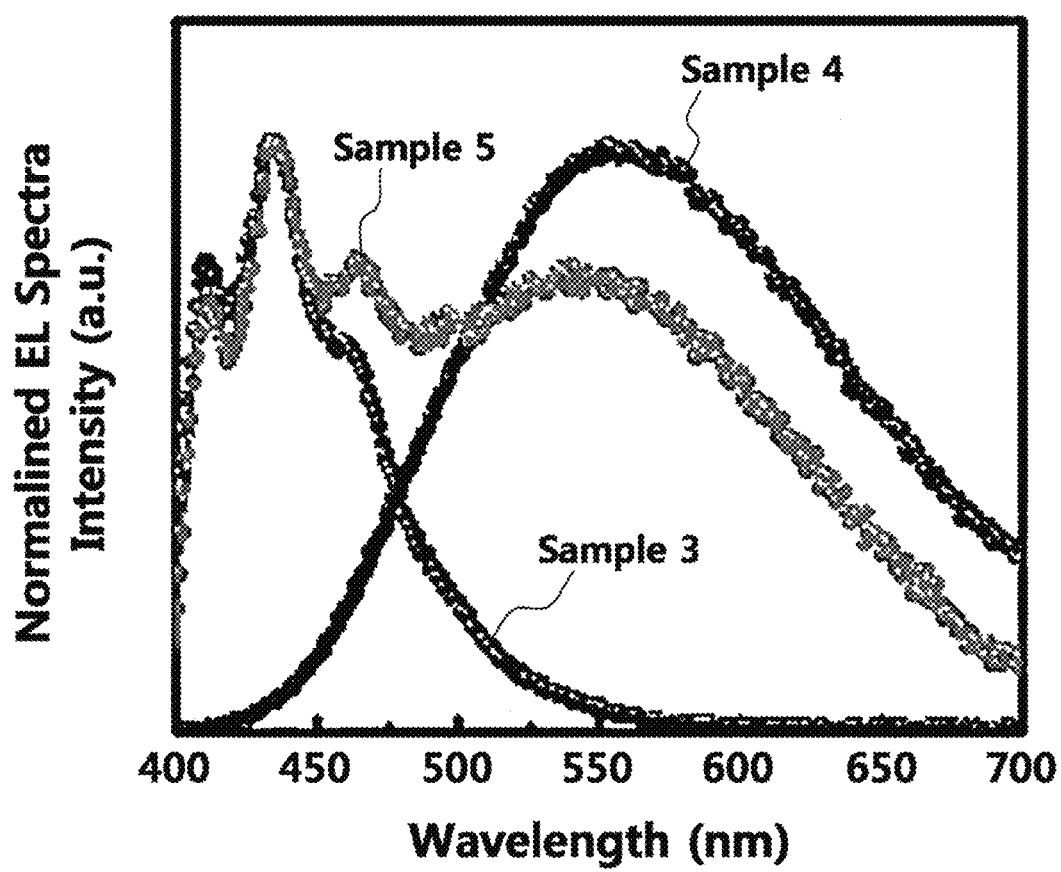
FIG. 11B is a photograph which illustrates that light is emitted when Sample 3 to Sample 5 according to Experimental Example 5 are irradiated with UV-LED and a color coordinate system.
Figure 11C:
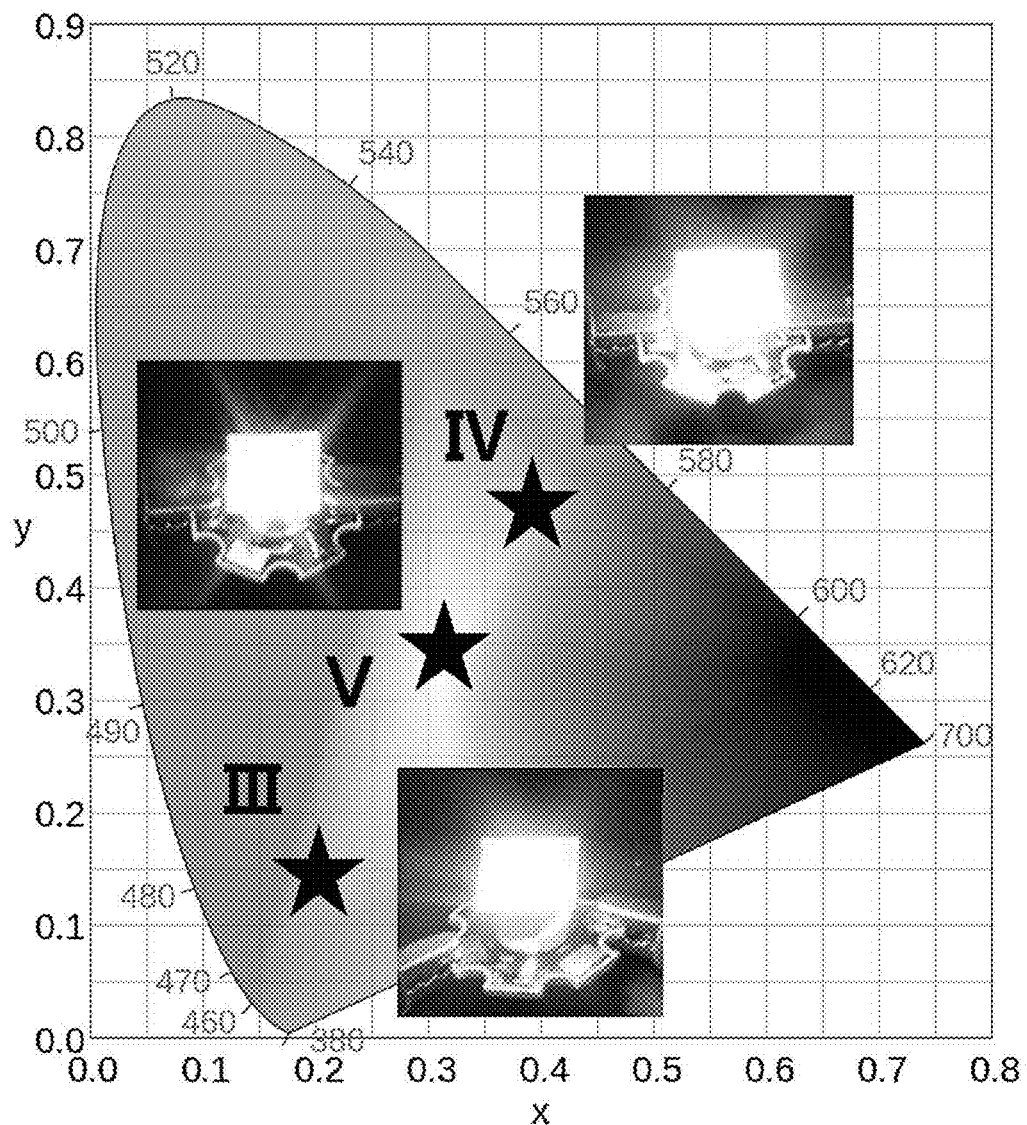
FIG. 11C illustrates emission spectra of Sample 3 to Sample 5 in FIG. 11B.

The zinc oxide quantum dots (ZnO), zinc oxide-graphene (ZnO-G) quantum dots, and the mixture of zinc oxide quantum dots (ZnO) and zinc oxide-graphene (ZnO-G) quantum dots prepared in Experimental Example 4 were each mixed with PDMS to form a film. (See FIG. 11A, before and after irradiation using 365 nm UV-lamp) It has been confirmed that the films emit blue, white, and yellow light using a UV-LED chip having an excitation wavelength of 365 nm and the emission spectra and color coordinates thereof were attained. (See FIGS. 11B and 11C)

The zinc oxide-based quantum dot aggregate capable of emitting white light according to the present disclosure has the following effects.

By eliminating the oxygen vacancies present in the zinc oxide quantum dots through the bonding of a zinc oxide quantum dot with graphene, high-intensity blue-based light emission can be realized regardless of the excitation wavelength or the applied voltage. In addition, white light emission can be realized through color rendering of the yellow light emission by the zinc oxide quantum dot and the blue-based light emission by the zinc oxide-graphene quantum dot. Moreover, CdSe which is a harmful substance can be excluded by applying zinc oxide which is an environmentally friendly material.

While the present disclosure has been described with respect to the specific embodiments, it will be apparent to those skilled in the art that various changes and modifications may be made without departing from the spirit and scope of the disclosure as defined in the following claims.

What is claimed is:

1. A zinc oxide-based quantum dot aggregate capable of emitting white light, which comprises a zinc oxide quantum dot and a zinc oxide-graphene quantum dot in mixture, wherein:

the zinc oxide quantum dot emits yellow light when being irradiated an excitation wavelength shorter than a wavelength corresponding to an energy band gap of the zinc oxide quantum dot;

the zinc oxide-graphene quantum dot is in a form in which a zinc oxide quantum dot is bound with graphene via a Zn—O—C bond and emits light of which photoluminescence intensity has a peak value only in a range of 410 to 495 nanometers regardless of the excitation wavelength;

the zinc oxide-graphene quantum dot has an interstitial Zn (Zni) energy level, an excited interstitial Zn (Zni*) energy level, a Zn vacancy (VZn) energy level, and a Zn—O—C energy level;

the interstitial Zn (Zni) energy level and the Zn vacancy (VZn) energy level are located between a conduction band minimum (CBM) and a valence band maximum (VBM) of the zinc oxide quantum dot;

the excited interstitial Zn (Zni*) energy level and the Zn—O—C energy level are at higher locations than an energy level of CBM of the zinc oxide quantum dot; and white light emission is possible through color rendering of yellow light emission by the zinc oxide quantum dot and blue-based light emission by the zinc oxide-graphene quantum dot.

2. The zinc oxide-based quantum dot aggregate capable of emitting white light according to claim 1, wherein the zinc oxide quantum dot and the zinc oxide-graphene quantum dot are mixed at a mass ratio of from 0.5 to 1.16:1.

3. The zinc oxide-based quantum dot aggregate capable of emitting white light according to claim 1, wherein the zinc oxide quantum dot and the zinc oxide-graphene quantum dot are mixed at a mass ratio of from 0.7 to 0.9:1.

4. The zinc oxide-based quantum dot aggregate capable of emitting white light according to claim 1, wherein blue-based light can be emitted as an excited electron is transited from any one or more of the interstitial Zn ($Zn_i$) energy level, the excited interstitial Zn ($Zn_i^*$) energy level, or the Zn—O—C energy level to the Zn vacancy ($V_{Zn}$) energy level.

5. The zinc oxide-based quantum dot aggregate capable of emitting white light according to claim 4, wherein oxygen vacancies ($V_o^+$, $V_o^{++}$) in the zinc oxide quantum dot are eliminated by a Zn—O—C bond between the zinc oxide quantum dot and graphene.

* * * * *